US007114183B1

(12) United States Patent
Joiner

(10) Patent No.: US 7,114,183 B1
(45) Date of Patent: Sep. 26, 2006

(54) NETWORK ADAPTIVE BASELINE MONITORING SYSTEM AND METHOD

(75) Inventor: Herbert V. Joiner, Allen, TX (US)

(73) Assignee: McAfee, Inc., Santa Clara, CA (US)

( * ) Notice: Subject to any disclaimer, the term of this patent is extended or adjusted under 35 U.S.C. 154(b) by 750 days.

(21) Appl. No.: 10/230,844

(22) Filed: Aug. 28, 2002

(51) Int. Cl.
*G06F 11/00* (2006.01)
*G06F 11/22* (2006.01)
*G06F 11/30* (2006.01)
*G06F 11/34* (2006.01)
*G06F 12/14* (2006.01)
*H04L 9/32* (2006.01)

(52) U.S. Cl. ............................ 726/23; 726/22; 726/24; 713/188

(58) Field of Classification Search .................. 726/22, 726/23, 24; 709/224; 713/188
See application file for complete search history.

(56) References Cited

U.S. PATENT DOCUMENTS

| | | | | |
|---|---|---|---|---|
| 5,627,886 | A * | 5/1997 | Bowman .................... | 379/111 |
| 6,266,531 | B1 * | 7/2001 | Zadeh et al. ................ | 455/453 |
| 6,279,035 | B1 * | 8/2001 | Brown et al. ............... | 709/224 |
| 6,308,272 | B1 * | 10/2001 | Pearce ......................... | 726/22 |
| 6,446,123 | B1 * | 9/2002 | Ballantine et al. .......... | 709/224 |
| 6,530,024 | B1 * | 3/2003 | Proctor ........................ | 726/23 |
| 6,718,384 | B1 * | 4/2004 | Linzy ........................... | 709/224 |
| 6,742,128 | B1 * | 5/2004 | Joiner ......................... | 726/25 |
| 2003/0009696 | A1 * | 1/2003 | Bunker V. et al. .......... | 713/201 |
| 2003/0028803 | A1 * | 2/2003 | Bunker et al. .............. | 713/201 |
| 2003/0149887 | A1 * | 8/2003 | Yadav ......................... | 713/200 |
| 2003/0149888 | A1 * | 8/2003 | Yadav ......................... | 713/200 |

OTHER PUBLICATIONS

McAfee The Vaccine For E-Business, "Network Associates Manages Its Worldwide Network Security With McAfee ePolicy Orchestrator", Aug. 1999, http://www.mcafeeb2b.com/common/media/mcafeeb2b/us/products/pdf/cs_us_nai_epo.pdf.

* cited by examiner

*Primary Examiner*—Ayaz Sheikh
*Assistant Examiner*—Christian La Forgia
(74) *Attorney, Agent, or Firm*—Zilka-Kotab, PC; Christopher J. Hamaty

(57) ABSTRACT

A system, method and computer program product are provided for adaptive network data monitoring. In use, network data may be monitored utilizing at least one threshold. Then, it is automatically detected whether there is a change in the network. If a change in the network is detected, the at least one threshold is automatically modified based on the change.

21 Claims, 8 Drawing Sheets

NETWORK ADAPTIVE BASELINE MONITORING SYSTEM AND METHOD

FIELD OF THE INVENTION

The present invention relates to network analyzers, and more particularly to collecting network data for network analysis.

BACKGROUND OF THE INVENTION

Numerous tools have been developed to aid in network management involving capacity planning, fault management, network monitoring, and performance measurement. One example of such tools is the network analyzer.

In general, a "network analyzer" is a program that monitors and analyzes network traffic, detecting bottlenecks and problems. Using this information, a network manager can keep traffic flowing efficiently. A network analyzer may also be used to capture data being transmitted on a network. The term "network analyzer" may further be used to describe a program that analyzes data other than network traffic. For example, a database can be analyzed for certain kinds of duplication. One example of a network analyzer is the SNIFFER® device manufactured by NETWORK ASSOCIATES, INC®.

During use of such network analyzers, users often can monitor network utilization, error rate, application response time, and/or numerous other parameters associated with network traffic and use. To facilitate this analysis, network analyzers often utilize static thresholds for applying to the foregoing parameters to bring a problem to the attention of a user. When, for example, a threshold is surpassed or met, an alert may be generated to prompt user action or further analysis and/or investigation.

Unfortunately, such thresholds are static in that they are applied independent of changes in the network. In other words, the thresholds are set independent of a status or configuration of the network. Thus, when one of the parameters changes in a detrimental manner to prompt an alert based on a threshold, it is assumed that this indicates a problem in a network requiring troubleshooting, etc. Unfortunately, this assumption leads to numerous false alerts. For example, if the threshold is met only due to a component being added, removed, or altered; the user is nevertheless prompted to further analyze or investigate the situation. Resources are thus wasted due to these false alerts.

There is thus a need for techniques of preventing changes in a network from prompting false alerts during network analysis.

DISCLOSURE OF THE INVENTION

A system, method and computer program product are provided for adaptive network data monitoring. In use, network data may be monitored utilizing at least one threshold. Then, it is automatically detected whether there is a change in the network. If a change in the network is detected, the at least one threshold is automatically modified based on the change.

In one embodiment, network data from a plurality of network data sources may be monitored. As an option, the monitored network data may be collected from a plurality of different network data sources including a network analyzer, an antivirus program, and a security program.

In another embodiment, the network data may be monitored over a time period. Such time period may optionally include a sliding time period.

In still another embodiment, it may be determined whether any of the thresholds are met based on the monitoring. If it is determined that any of the thresholds are met, an alert may be generated.

It may be further determined whether the modified thresholds violate any rules. If the modified thresholds violate any of the rules, user intervention may be prompted. As an option, the rules and the thresholds may be user-configured. Still yet, the rules and the thresholds may be configured during an initialization process.

As an option, the change may include adding a network component of the network, removing a network component of the network, and/or changing a network component of the network. Still yet, the at least one threshold may be indicative of a threat to the network.

DESCRIPTION OF THE PREFERRED EMBODIMENTS

Figure 1:
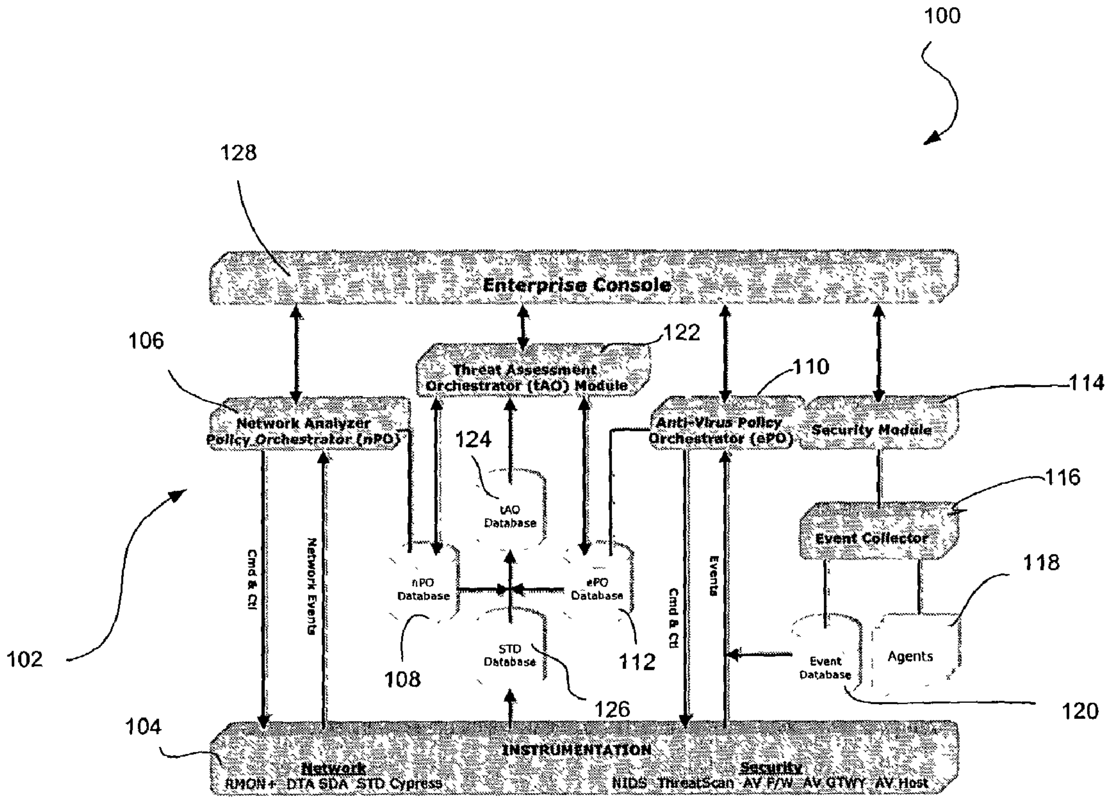
FIG. 1 illustrates a system for assessing threats to a network utilizing a plurality of data sources, in accordance with one embodiment.

FIG. 1 illustrates a system 100 for assessing threats to a network utilizing a plurality of data sources, in accordance with one embodiment. As shown, included is a plurality of modules 102 coupled to a network 104. In the context of the present system 100, the network 104 may take any form including, but not limited to a local area network (LAN), a wide area network (WAN) such as the Internet, etc.

The modules 102 include a network analyzer policy orchestrator module 106 coupled between the network 104 and a network analyzer database 108, an antivirus policy orchestrator module 110 coupled between the network 104 and an antivirus database 112, a security module 114 including an event collector 116 and a plurality of agents 118 coupled to a security event database 120, and a threat assessment orchestrator module 122 coupled to a threat assessment orchestrator database 124.

The threat assessment orchestrator module 122 is coupled to the network analyzer database 108, antivirus database 112, security event database 120, threat assessment orchestrator database 124, and a stream-to-disk (STD) database 126. Such STD database 126 is coupled to the network 104 for collecting component-level network component data from components on the network 104. For example, such network component data may include various information (i.e. source and destination IP addresses, time of delivery, response time, etc.) associated with different network hardware (i.e. routers, clients, etc.).

Further provided is an enterprise console 128 coupled to the network analyzer policy orchestrator module 106, antivirus policy orchestrator module 110, security module 114, and threat assessment orchestrator module 122. The enterprise console 128 is an interface layer structured to support data representation associated with network data from each of the aforementioned databases. Ideally, it may be used with each data representation in a "plug & play" fashion.

In use, the network analyzer policy orchestrator module 106 is adapted for collecting network performance data. As an option, this may be accomplished by utilizing commands and control data to monitor and collect network events represented by the network performance data. Once collected, the network performance data is stored in the network analyzer database 108.

In the context of the present description, the network performance data may include, for example, network utilization data, application response time data, error rate data, and/or any other data relating to the performance of the network 104. Moreover, the network analyzer policy orchestrator module 106 may include any network analyzer capable of collecting and/or generating network performance data.

On the other hand, the antivirus policy orchestrator module 110 is adapted for collecting virus activity data. Similar to the previous module, this may be accomplished by utilizing commands and control data to monitor and collect network events represented by the virus activity data. Once collected, the virus activity data is stored in the antivirus database 112.

In the context of the present description, the virus activity data may include, for example, virus signatures, virus indicators, and/or any other data relating to virus activity on the network 104. Moreover, the antivirus policy orchestrator module 110 may include any antivirus program or device capable of collecting and/or generating virus activity data.

Still yet, the security module 114 is adapted for collecting network intrusion data. This may be carried out utilizing a plurality of agents 118 located on various components of the network 104 which forward network events to the event collector 116. The event collector 116, in turn, stores the network intrusion data in the security event database 120 which feeds the antivirus policy orchestrator module 110.

In the context of the present description, the network intrusion data may include, for example, intrusion signatures, intrusion indicators, and/or any other data relating to intrusion activity on the network 104. Moreover, the security module 114 may include any intrusion security program or device capable of collecting and/or generating intrusion activity data.

In use, the threat assessment orchestrator module 122 aggregates and correlates the different types of network data from the network analyzer database 108, antivirus database 112, security event database 120, and the STD database 126; and stores the same in the threat assessment orchestrator database 124. The threat assessment orchestrator database 124 is thus adapted for assessing threats to the network 104 utilizing a plurality of data sources. In use, threats to the network 104 may be assessed utilizing the network data in the threat assessment orchestrator database 124.

By compiling and organizing such data in a single repository, the threat assessment orchestrator database 124, the threat assessment orchestrator module 122 is adapted for more effectively assessing threats to the network 104. In the context of the present description, such threats may include anything that threatens the security of the network 104.

In one embodiment, the threat assessment orchestrator module 122 may be scalable, include a hybrid architecture that supports the devices associated with each of the different data representations, and may be a distributed and robust enterprise solution. More information regarding the threat assessment orchestrator module 122 will be set forth in greater detail during reference to FIG. 2.

Figure 2:
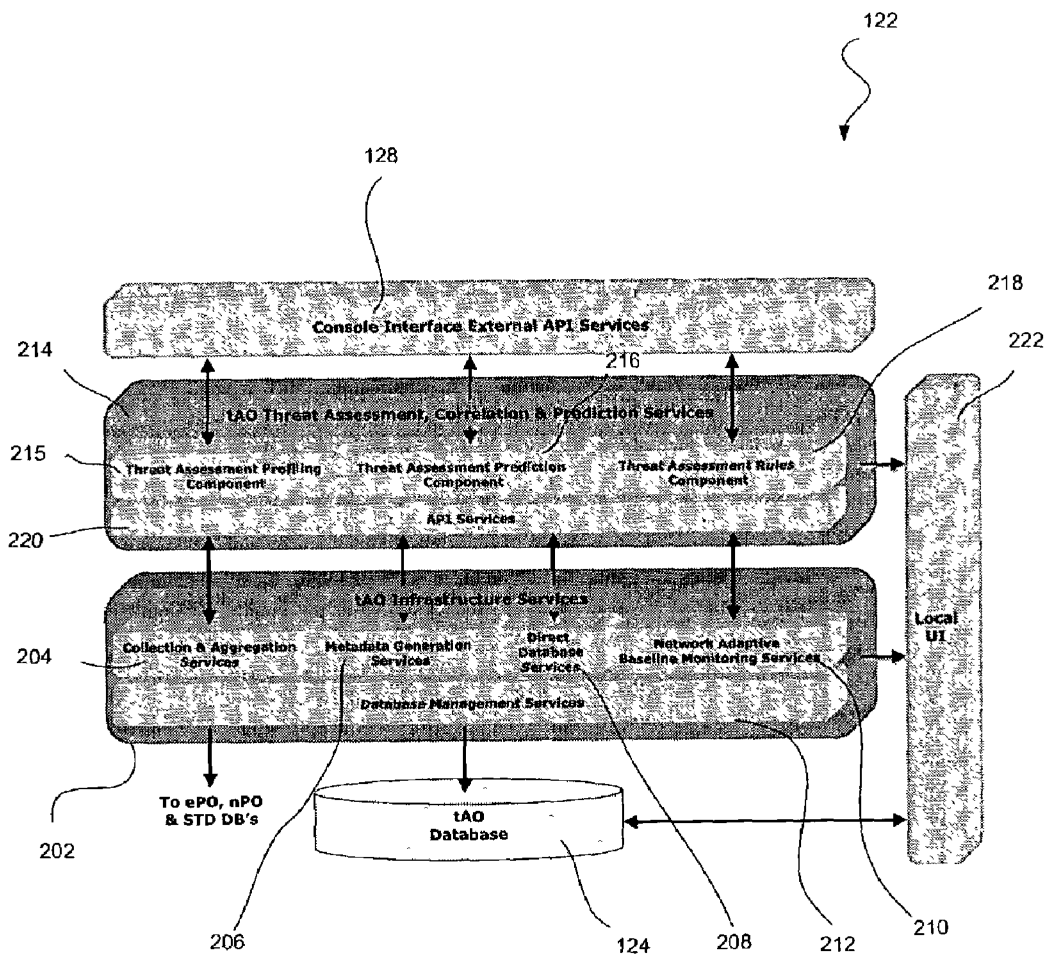
FIG. 2 illustrates a more detailed schematic of a threat assessment orchestrator module for assessing threats to a network, in accordance with one embodiment.

FIG. 2 illustrates a threat assessment orchestrator module 122 for assessing threats to a network utilizing a plurality of data sources, in accordance with one embodiment. In one embodiment, the threat assessment orchestrator module 122 may be implemented in the context of the system 100 of FIG. 1. Of course, however, the threat assessment orchestrator module 122 may be implemented in any desired context.

As shown in FIG. 2, provided is a threat assessment orchestrator infrastructure framework 202 including a collection and aggregation module 204, a metadata generation module 206, a direct database module 208, a network adaptive baseline monitoring module 210, and a database management module 212. In use, the database management module 212 interfaces the databases of FIG. 1 with the various remaining modules of the threat assessment orchestrator infrastructure framework 202.

Further provided is a threat assessment, correlation, and prediction framework 214 including a threat assessment profiling module 215, a threat assessment prediction module 216, and a threat assessment rules module 218. Such modules of the threat assessment, correlation, and prediction framework 214 are coupled to an application program interface module 220 adapted for interfacing with the various modules of the threat assessment orchestrator infrastructure framework 202.

Coupled to the threat assessment orchestrator infrastructure framework 202 and the threat assessment, correlation, and prediction framework 214 is a user interface 222. In use, the user interface 222 allows a user to control the various modules of the present embodiment. More information regarding such modules will now be set forth.

In use, the database management module 212 provides encapsulated low and mid-level database services that the upper layers can use for any database interaction. Moreover, the collection and aggregation module 204 extracts data from the remaining databases of FIG. 1 based on configurable policies and rules. It then stores the extracted data into the threat assessment orchestrator database 124 based on the rules and policies. Still yet, the metadata generation module 206 performs first-order data reduction on the overall detailed data collected from the multiple network data sources of FIG. 1.

The network adaptive baseline monitoring module 210 performs a rich intelligent baseline monitoring function on network activity. Using this functionality, one can proactively identify changes in network behavior by collecting user configurable network histograms and then applying heuristics to form conclusions. These can be further classified (based on a profile change) into various levels of threat assessment and prediction by the threat assessment, correlation, and prediction framework 214.

Using the network adaptive baseline monitoring module 210 as an additional valuable data source, one can blend the aforementioned network performance data, virus activity data, network intrusion data, etc. into a cohesive solution to provide a quantitative result. The net result of this provides a "pro-active" model which significantly reduces a reaction time to threats once they are recognized by pointing quickly to the sources that are creating and propagating the threats.

Turning now toward the functionality of the threat assessment, correlation, and prediction framework 214; this framework uses rules defined by the threat assessment rules module 218 for profiling to perform data mining on the threat assessment orchestrator database 124 and identify suspect activity. In particular, the threat assessment rules module 218 allows users to define and manage the operational behavior of the remaining threat assessment modules of the present framework. It may also be designed such that it supports run-time updates over the web to support subscription-based services.

To this end, the threat assessment, correlation, and prediction framework 214 correlates all the network data sources to profile and identify behavior that is outside the norm (i.e. pro-active analysis) and also searches for known behavior (i.e. re-active analysis). Configurable alert levels can further be raised as defined by each customer environment.

With specific attention to the threat assessment prediction module 216, this component contains functionality that focuses on predicting threats. It may constantly monitor the behavior of activity from multiple network data sources and use predefined rules to attempt to predict malicious activity, or threats. Using known profiles (i.e. attack patterns, behavior, etc.); it is capable of forming an assessment indicator. It can also use other data points (i.e. such as previously unknown network addresses suddenly appearing in the network) to aid in providing an overall threat assessment prediction in percentage terms, for example. In other words, it may constantly look for behavior that falls outside of behavior norms and then assigns a risk factor to the result. This allows one to pro-actively dig deeper into the anomaly before any major damage is done.

The threat assessment profiling module 215 operates in a manner similar to the threat assessment prediction module 216, except that it operates with more concrete information. In particular, it attempts to match network behavior with indicators known to be associated with potential threats to a network. More information will now be set forth regarding an exemplary operation of the foregoing system.

Figure 3:
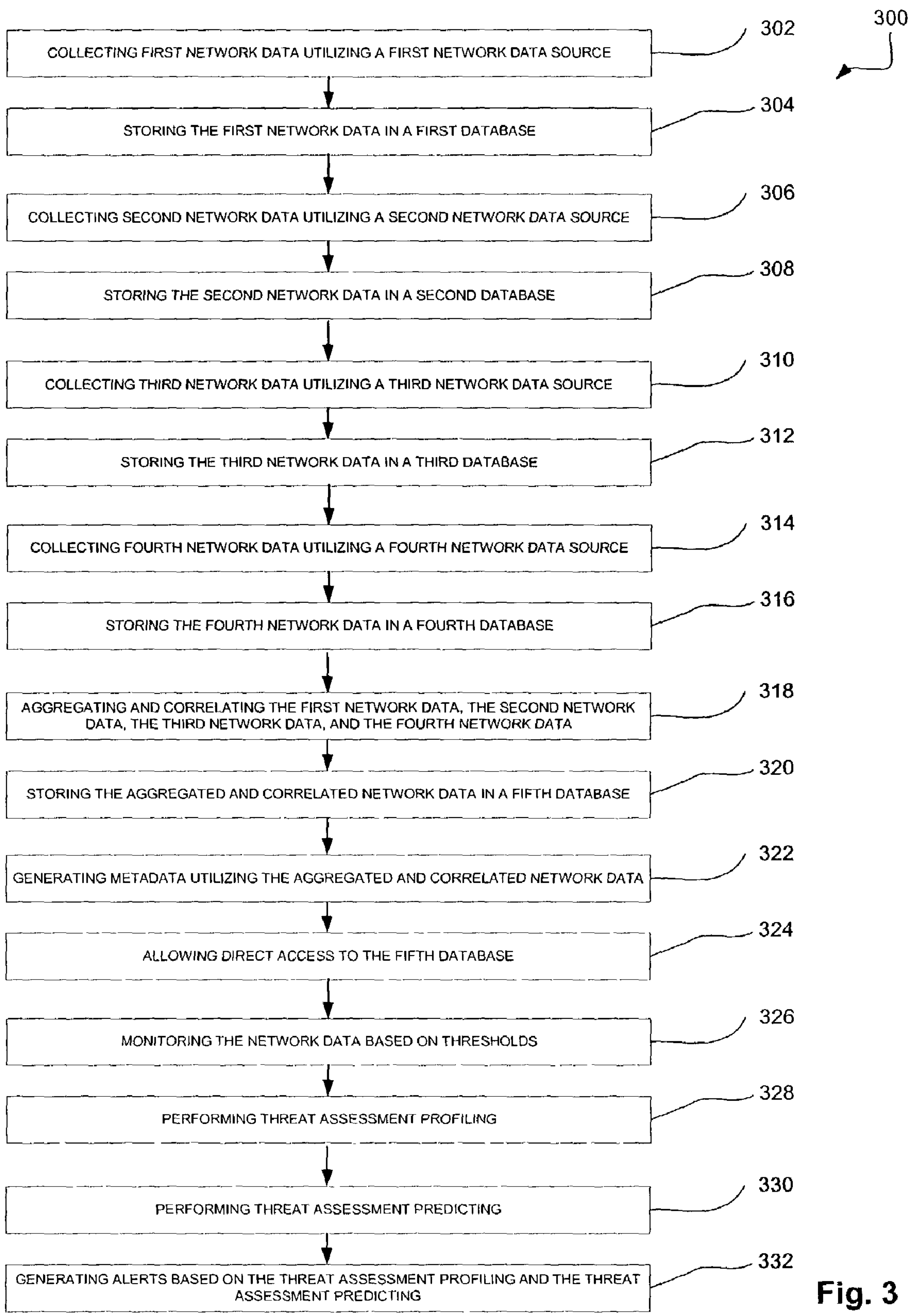
FIG. 3 illustrates a method for assessing threats to a network utilizing a plurality of data sources, in accordance with one embodiment.

FIG. 3 illustrates a method 300 for assessing threats to a network utilizing a plurality of data sources, in accordance with one embodiment. In one embodiment, the present method 300 may be implemented in the context of the systems of FIGS. 1 and 2. Of course, however, the present method 300 may be implemented in any desired context.

Initially, in operation 302, first network data is collected utilizing a first network data source. As an option, the first network data source may include a network analyzer and the first network data may include network performance data such as network utilization data, application response time data, and error rate data; as set forth earlier during reference to FIGS. 1 and 2. Once collected, the first network data may be stored in a first database (i.e. network analyzer database 108 of FIG. 1). See operation 304.

Next, in operation 306, second network data is collected utilizing a second network data source. Optionally, the second network data may include an antivirus program, and the second network data may include virus activity data; as set forth earlier during reference to FIGS. 1 and 2. In operation 308, the second network data may be stored in a second database (i.e. antivirus database 112 of FIG. 1).

Third network data is then collected utilizing a third network data source. In the context of the systems of FIGS. 1 and 2, such third network data source may include a security program including a plurality of agents and an event collector. Moreover, the third network data may include network intrusion data. In operation 312, the third network data may be stored in a third database (i.e. security event database 120 of FIG. 1).

Fourth network data is then collected utilizing a fourth network data source, as indicated in operation 314. As an option, the fourth network data may include network component data associated with a plurality of components of the network. The fourth network data may also be stored in a fourth database (i.e. STD database 126 of FIG. 1). Note operation 316.

The first network data, the second network data, the third network data, and the fourth network data are then aggregated and correlated in operation 318. Specifically, the related network data may be grouped and organized in a manner that permits effective analysis of the same for potential threats. Just by way of example, network data from the different network data sources associated with a particular IP address or network component may be aggregated and correlated together for analysis purposes.

In one embodiment, this may be accomplished utilizing the threat assessment orchestrator infrastructure framework 202 of FIG. 2. Similar to the other network data, the aggregated and correlated network data may be stored in a fifth database (i.e. threat assessment orchestrator database 124 of FIG. 1). See operation 320.

At this point, in operation 322, metadata may be generated utilizing the aggregated and correlated network data. Such metadata may be used by the threat assessment, correlation, and prediction framework 214 for conveniently accessing and managing the aggregated and correlated network data. In one embodiment, this may be accomplished utilizing the metadata generation module 206 of FIG. 2. Still yet, the threat assessment, correlation, and prediction framework 214 may be allowed direct access to the fifth database (i.e. threat assessment orchestrator database 124 of FIG. 1). See operation 324. As an option, this may be handled by a direct database module 208 like that of FIG. 2.

In operation 326, the various network data may be monitored utilizing a baseline monitoring application for producing enhanced threshold-based alerts, etc. This may be accomplished by, for example, the network adaptive baseline monitoring module 210 of FIG. 2. More information regarding such monitoring will be set forth in greater detail with reference to FIG. 4.

Continuing with reference to FIG. 3, a plurality of rules is identified. This may be accomplished utilizing the threat assessment rules module 218 of FIG. 2 which may, in turn, be configured by a user.

Threat assessment profiling is then carried out utilizing the aggregated and correlated network data and the results of the monitoring of operation 326, in accordance with the rules. Note operation 328. More information regarding such profiling will be set forth in greater detail during reference to FIG. 5.

Subsequently, in operation 330, threat assessment predicting is performed utilizing the aggregated and correlated network data and the results of the monitoring of operation 326, in accordance with the rules. More information regarding such prediction will be set forth in greater detail during reference to FIG. 6.

Alerts may then be generated based on the threat assessment profiling and the threat assessment predicting. Note operation 332. Various graphical user interfaces may be employed to facilitate such assessment. More information regarding such graphical user interfaces will be set forth in greater detail with reference to FIGS. 7–8.

Figure 4:
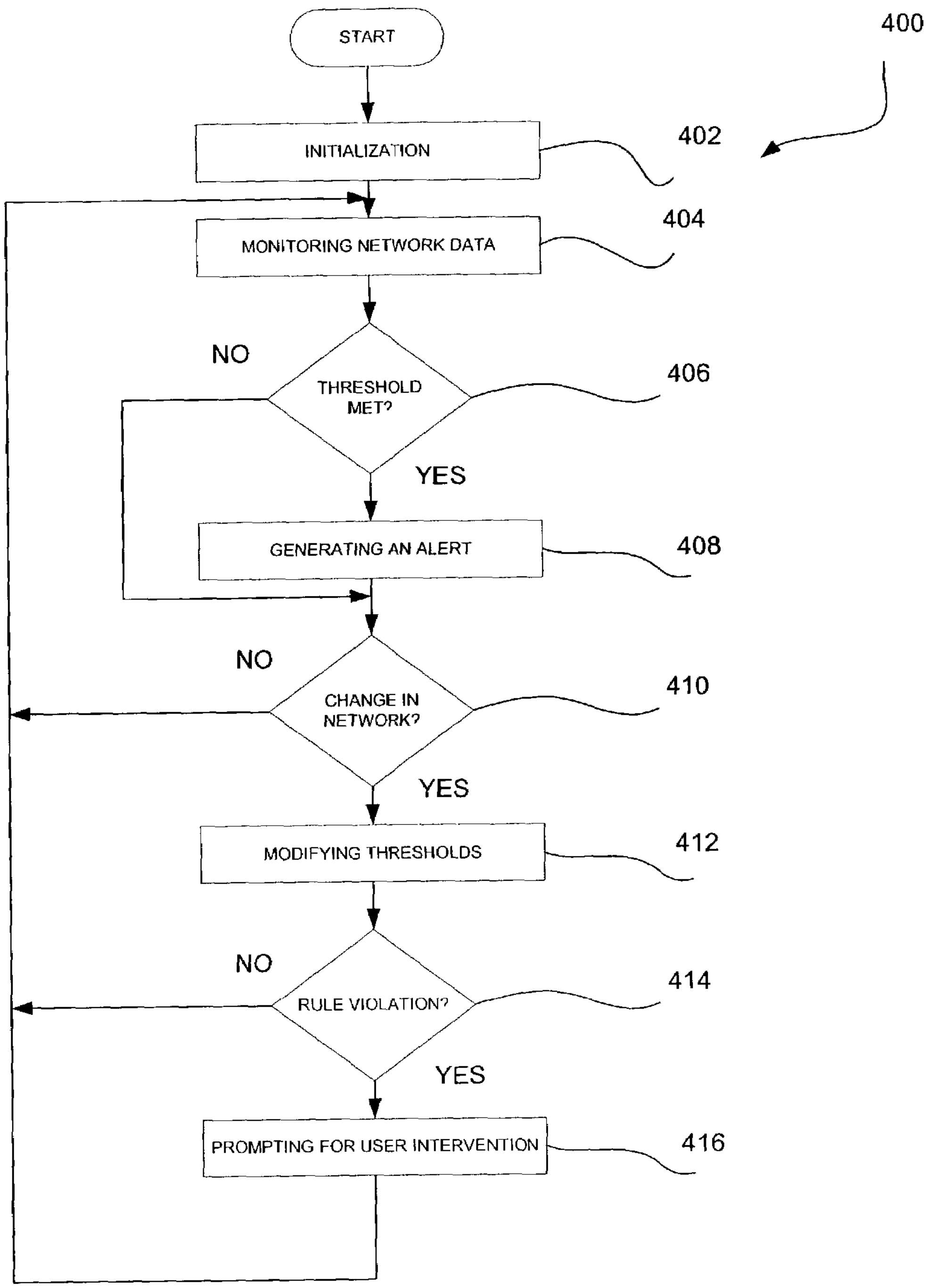
FIG. 4 illustrates a method for adaptive baseline monitoring, in accordance with operation 326 of FIG. 3.

FIG. 4 illustrates a method 400 for adaptive baseline monitoring, in accordance with operation 326 of FIG. 3. In one embodiment, the present method 400 may be implemented in the context of the systems of FIGS. 1 and 2 and/or the method 300 of FIG. 3. Of course, however, the present method 400 may be implemented in any desired context.

Initially, in operation 402, an initialization processing is carried out. Such initialization may involve various functions including, but not limited to selecting a time period for reasons that will soon become apparent, identifying a plurality of thresholds, and identifying a plurality of rules associated with the thresholds. The thresholds may include any limit, indicator, parameter, etc. that may be met by the network data, and thus be indicative of a threat to the network. Moreover, such rules may include restraints, limits, etc. regarding the manner in which the thresholds may be modified. In use, the rules and the thresholds may be user-configured. This may, in one embodiment, be accomplished utilizing the user interface 222 of FIG. 2.

Next, network data from a plurality of network data sources of a network is monitored over the time period. See operation 404. In the context of the present description, such network data may include any of the aforementioned network data, or any other data related to a network for that matter. Of course, the monitored network data may be collected from a plurality of different network data sources including a network analyzer, an antivirus program, a security program, etc.

Ideally, the network data is monitored over a sliding window. In other words, network data is analyzed for a predetermined time period, after which network data collected at the beginning of the period is dropped as new data is gathered and monitored. To this end, network data associated with the predetermined time period or duration is stored at each instance of monitoring.

Next, in decision 406, it is automatically determined whether any of the thresholds are met based on the monitoring. If it is determined in decision 406 that any of the thresholds are met, an alert is automatically generated in operation 408.

For the purpose of preventing false alarms in the context of the present method 400, it is automatically detected in decision 410 whether there is a change in the network. As an option, the change may include adding a network component of the network, removing a network component of the network, changing a network component of the network, or any other alteration of the network.

If a change in the network is detected in decision 410, the thresholds are modified based on the change in operation 412. In particular, the thresholds may be increased, decreased, etc. such that appropriate network data which would not trigger a threshold prior to the change, would continue to not trigger the threshold after the change. This may be accomplished using a look-up table, a simple formula, a rule set, etc. Of course, the thresholds may be adjusted in any desired manner which accommodates the change.

It should be noted that it is conceivable that the thresholds may potentially be adjusted beyond an acceptable amount by the foregoing technique, as defined by the aforementioned rules. For this reason, it is automatically determined in decision 414 whether the modified thresholds violate any of the rules. Thereafter, the user is prompted for user intervention (i.e. further analysis, investigation, manual threshold adjustment, etc.) if the modified thresholds violate any of the rules.

Figure 5:
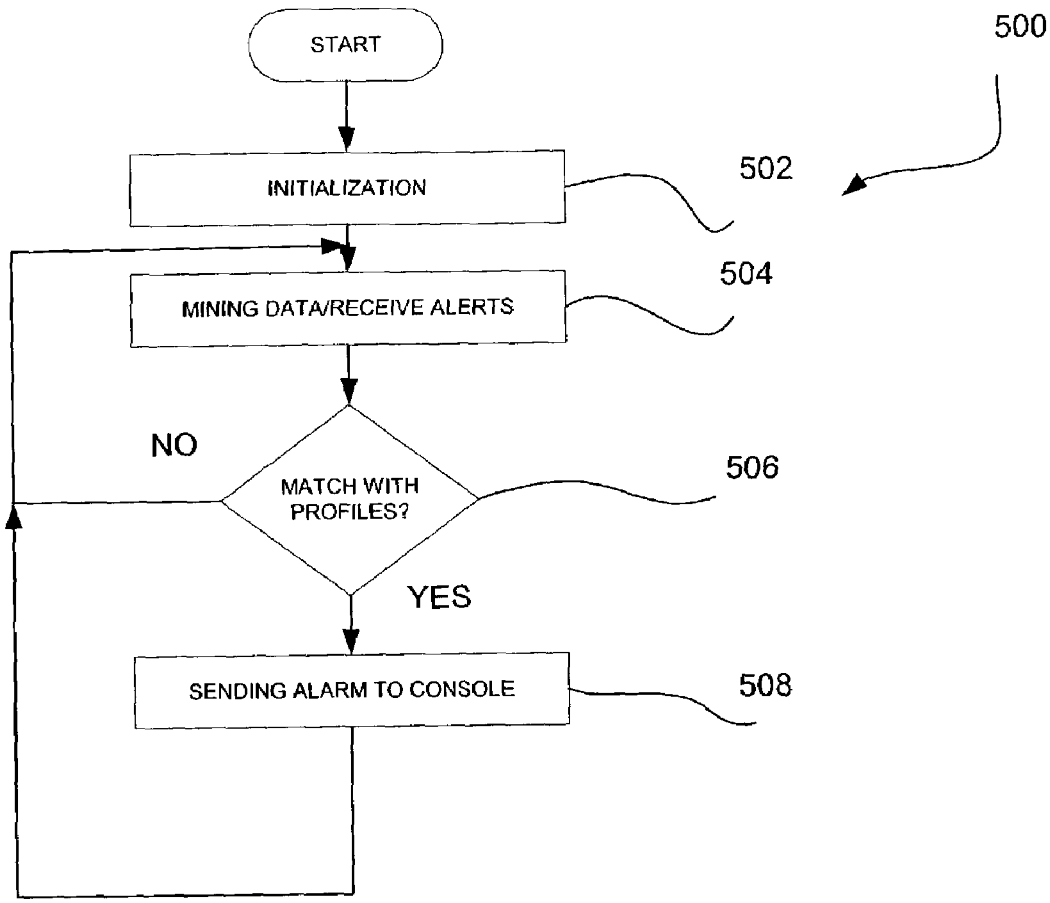
FIG. 5 illustrates a method for threat assessment profiling, in accordance with operation 328 of FIG. 3.

FIG. 5 illustrates a method 500 for threat assessment profiling, in accordance with operation 328 of FIG. 3. In one embodiment, the present method 500 may be implemented in the context of the systems of FIGS. 1 and 2 and/or the method 300 of FIG. 3. Of course, however, the present method 500 may be implemented in any desired context.

As mentioned earlier, threat assessment profiling is performed utilizing the aggregated and correlated network data and results of the method 400 of FIG. 4, in accordance with the rules. This is accomplished by an initialization operation 502, whereby the profiles are defined in accordance with the rules. Thereafter, in operation 504, the network data is mined, and results (i.e. alerts, etc.) of the method 400 of FIG. 4 are received. In one embodiment, such monitoring results may be optionally generated by and received from the network adaptive baseline monitoring module 210 of FIG. 2.

Such profiles may take various forms. For example, such profiles may indicate a sequence of actions associated with threats over time. For example, one of such profiles may indicate a first threshold at time 0, after which one or more additional thresholds at time 1, 3, and so forth.

During the course of the foregoing mining, predetermined profiles are compared with the aggregated and correlated network data and the results of the method 400 of FIG. 4. See decision 506. Upon a successful comparison, an alert is generated for output via an interface. See operation 508.

Figure 6:
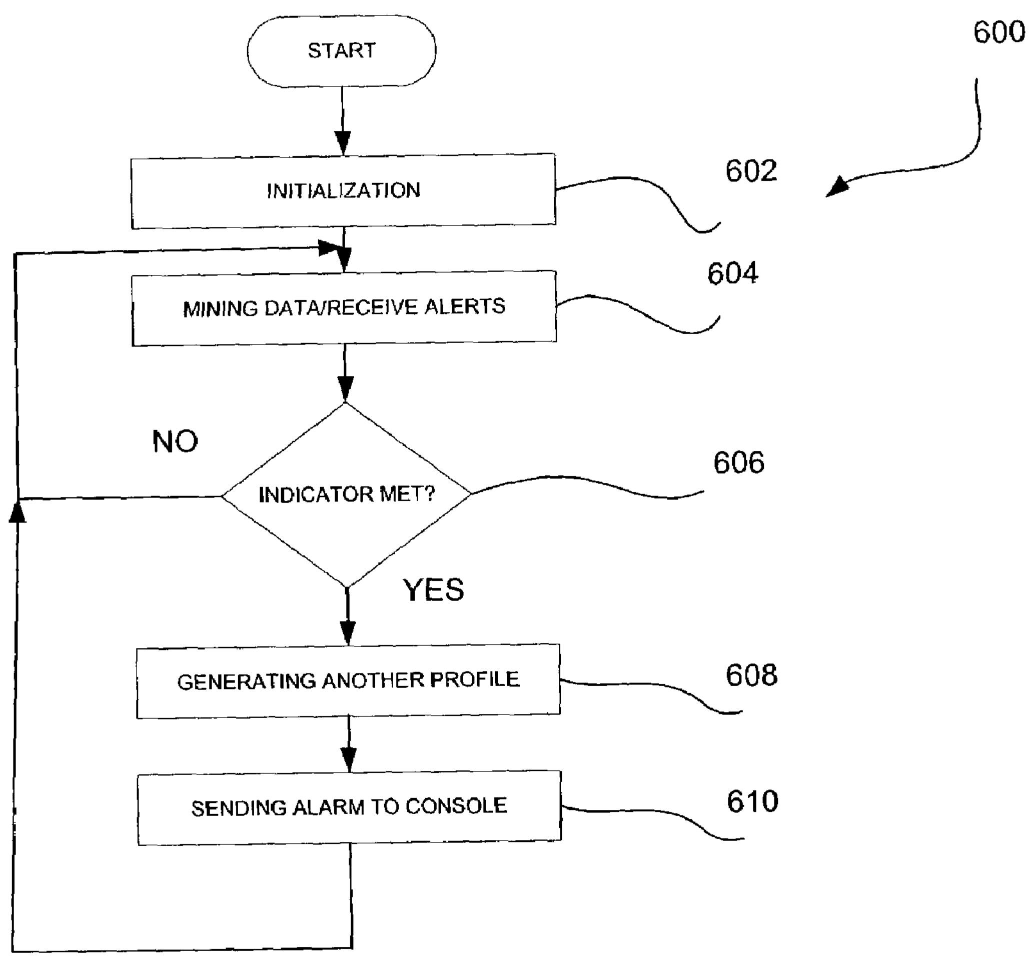
FIG. 6 illustrates a method for threat assessment predicting, in accordance with operation 330 of FIG. 3.

FIG. 6 illustrates a method 600 for threat assessment predicting, in accordance with operation 330 of FIG. 3. In one embodiment, the present method 600 may be implemented in the context of the systems of FIGS. 1 and 2 and/or the method 300 of FIG. 3. Of course, however, the present method 600 may be implemented in any desired context.

As mentioned earlier, threat assessment predicting is performed utilizing the aggregated and correlated network data and results of the method 400 of FIG. 4, in accordance with the rules. Moreover, the threat assessment predicting operates using more abstract criteria with respect to the threat assessment profiling method 500 of FIG. 5. Specifically, instead of profiles, the present threat assessment predicting method 600 provides indicators which may be compared against the network data. Such indicators may include portions (i.e. percentages, etc.) of the aforementioned profiles, anomalous network behavior, certain alerts from the adaptive baseline monitoring module 210 of FIG. 2, etc.

In use, an initialization operation 602 is initiated, whereby indicators are defined in accordance with the rules. Thereafter, in operation 604, the network data is mined, and results (i.e. alerts, etc.) of the method 400 of FIG. 4 are received. In one embodiment, such monitoring results may be optionally generated by and received from the network adaptive baseline monitoring module 210 of FIG. 2.

During the course of such mining, predetermined indicators are compared with the aggregated and correlated network data and the results of the method 400 of FIG. 4. See decision 606. Upon a successful comparison, another profile may be generated in operation 608. Of course, this additional profile may then be used during the course of the threat assessment profiling method 500 of FIG. 5. Moreover, an alert is generated for output via an interface. See operation 610.

Figure 7:
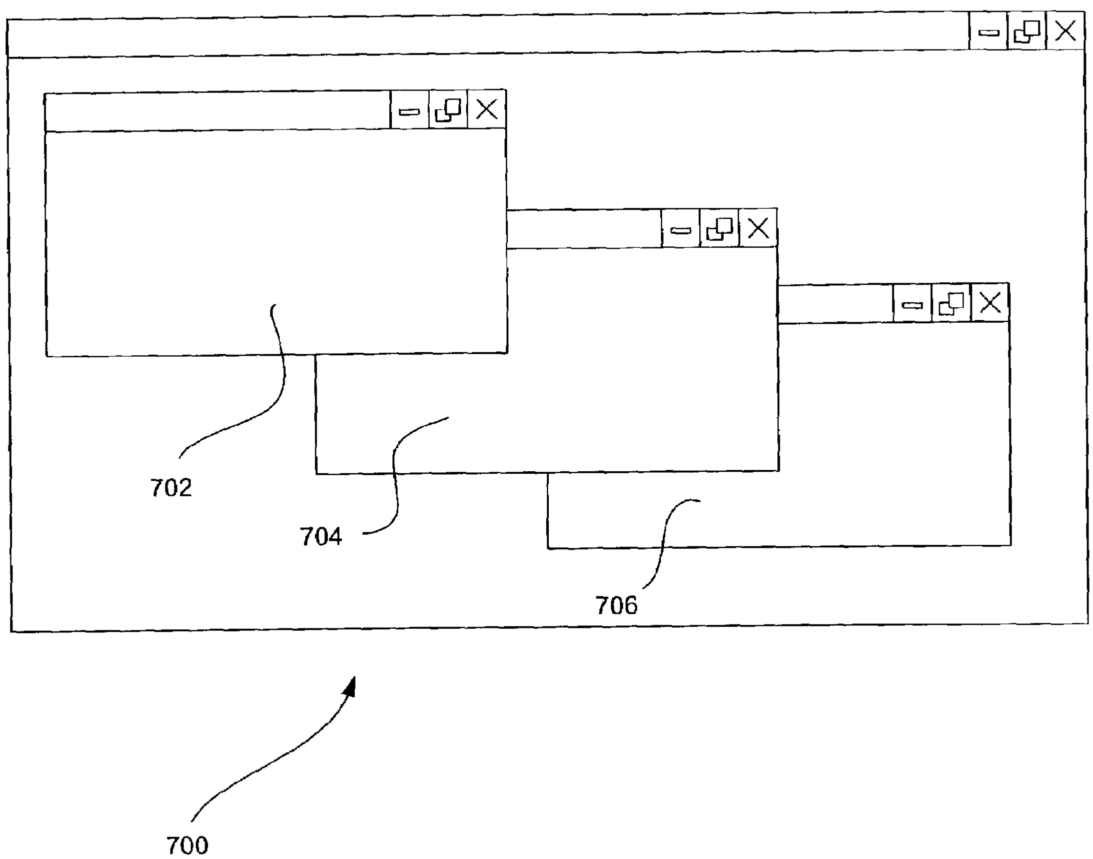
FIG. 7 illustrates an interface for graphically displaying threats to a network utilizing a graphical user interface, in accordance with one embodiment.

FIG. 7 illustrates an interface 700 for graphically displaying threats to a network utilizing a graphical user interface, in accordance with one embodiment. In one embodiment, the present interface 700 may be implemented in the context of the systems of FIGS. 1 and 2 and/or the methods of FIGS. 3–6. Of course, however, the present interface 700 may be implemented in any desired context.

As shown, a first window 702 is provided for displaying first network data collected from a first network data source. Further included is a second window 704 for displaying second network data collected from a second network data source. Still yet, a third window 706 is provided for displaying third network data collected from a third network data source.

Of course, any number of more or less windows may be utilized per the desires of the user. Moreover, the network data sources and network data may be of any type mentioned hereinabove. In any case, the first window 702, the second window 704, and the third window 706 are utilized for assessing threats to a network.

Various options may be employed in the context of the present interface 700. For example, the various windows may be displayed simultaneously or separately, organized on the interface 700 to maximize use of space, avoid or allow overlap of the windows, etc. Still yet, the contents of the windows may be combined in fewer windows to provide an amalgamation, comparison, or summary of such contents.

Figure 8:
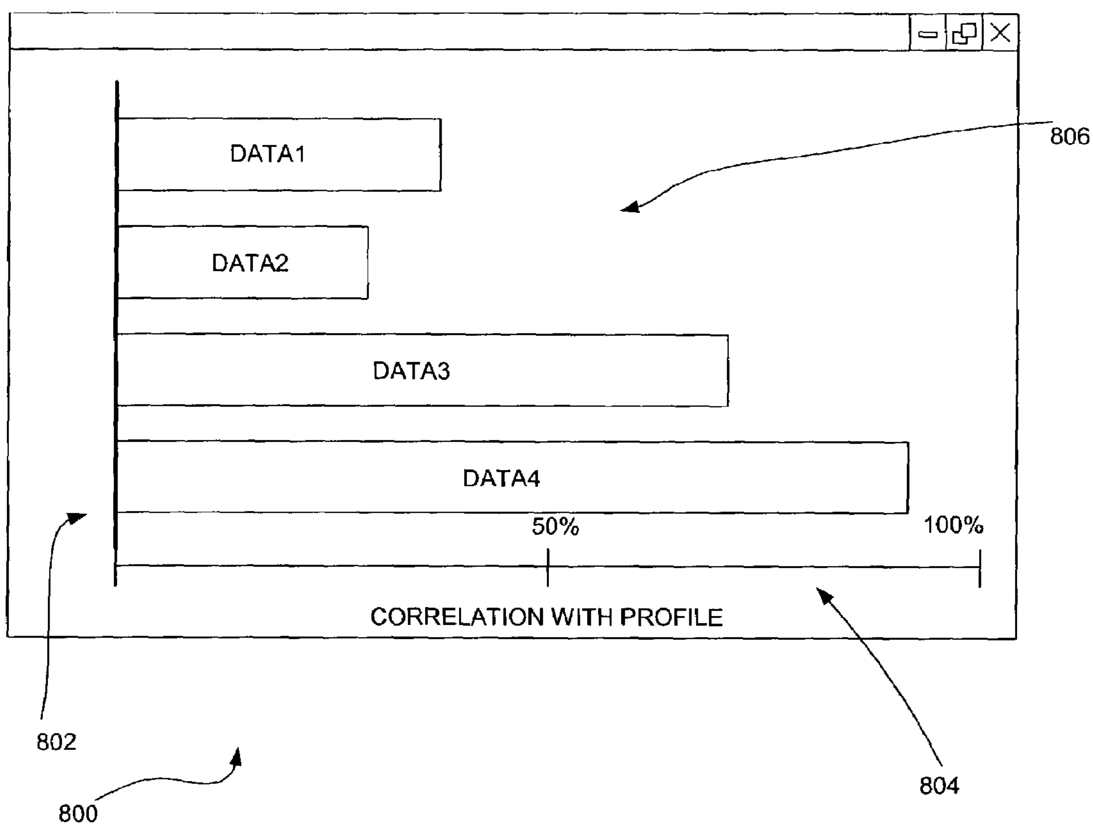
FIG. 8 illustrates an interface for graphically displaying threats to a network utilizing a graphical user interface, in accordance with another embodiment.

FIG. 8 illustrates an interface 800 for graphically displaying threats to a network utilizing a graphical user interface, in accordance with another embodiment. In one embodiment, the present interface 800 may be implemented in the context of the systems of FIGS. 1 and 2 and/or the methods of FIGS. 3–6. Of course, however, the present interface 800 may be implemented in any desired context.

As shown in FIG. 8, a graph 806 is provided for displaying threats to a network utilizing a graphical user interface. Such graph 806 includes a Y-axis 802 identifying a plurality of sets or groups of network data. Of course, the network data may include any of the data set forth hereinabove. On an X-axis 804, an extent to which the data sets correlate or overlap with a predetermined profile is set forth. In the present illustrated example, the fourth data set has the most overlap with a particular profile.

As is now apparent, the present interface 800 may be used to graphically illustrate the results of the method 500 of FIG. 5. Of course, the present interface 800 may be used in any desired environment.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method for adaptive network data monitoring, comprising:

monitoring network data utilizing at least one threshold;

automatically detecting whether there is a change in a network; and if a change in the network is detected, automatically modifying the at least one threshold based on the change;

wherein the change includes at least one of adding a network component of the network, removing a network component of the network, and changing a network component of the network;

wherein a user interface is included with a graph for displaying threats to the network, the graph including a Y-axis identifying a plurality of groups of the network data, and an X-axis identifying an extent to which the groups at least one of correlate and overlap with a predetermined profile.

2. The method as recited in claim 1, wherein the network data from a plurality of network data sources is monitored.

3. The method as recited in claim 2, wherein the network data is monitored over a sliding time period.

4. The method as recited in claim 1, wherein the network data is monitored over a time period.

5. The method as recited in claim 1, and further comprising determining whether any threshold is met based on the monitoring.

6. The method as recited in claim 5, wherein if it is determined that any threshold is met, further comprising generating an alert.

7. The method as recited in claim 1, and further comprising determining whether the modified threshold violates any rules.

8. The method as recited in claim 7, wherein if the modified threshold violates any of the rules, further comprising prompting for user intervention.

9. The method as recited in claim 7, wherein the rules and the at least one threshold are user-configured.

10. The method as recited in claim 7, wherein the rules and the at least one threshold are configured during an initialization process.

11. The method as recited in claim 1, wherein the monitored network data is collected from a plurality of different network data sources including a network analyzer, an antivirus program, and a security program.

12. The method as recited in claim 1, wherein the at least one threshold is indicative of a threat to the network.

13. The method as recited in claim 1, wherein the at least one threshold is modified such that the network data which would not trigger the at least one threshold prior to the change, would continue to not trigger the at least one threshold after the change.

14. The method as recited in claim 1, wherein the at least one threshold is modified using a look-up table.

15. The method as recited in claim 1, wherein the at least one threshold is modified using a formula.

16. The method as recited in claim 1, wherein the at least one threshold is modified using a rule set.

17. The method as recited in claim 1, wherein another user interface is included with a first window for displaying first network data collected from a first network data source, a second window for displaying second network data collected from a second network data source, and a third window for displaying third network data collected from a third network data source.

18. A computer program product embodied on a computer readable medium for adaptive network data monitoring, comprising:

computer code for monitoring network data utilizing at least one threshold;

computer code for automatically detecting whether there is a change in a network; and computer code for automatically modifying the at least one threshold based on the change, if a change in the network is detected;

wherein the change includes at least one of adding a network component of the network, removing a network component of the network, and changing a network component of the network;

wherein a user interface is included with a graph for displaying threats to the network, the graph including a first axis identifying a plurality of groups of the network data, and an second axis identifying an extent to which the groups at least one of correlate and overlap with a predetermined profile.

19. A system for adaptive network data monitoring, comprising:

means for monitoring network data utilizing at least one threshold;

means for automatically detecting whether there is a change in a network; and means for automatically modifying the at least one threshold based on the change, if a change in the network is detected;

wherein the change includes at least one of adding a network component of the network, removing a network component of the network, and changing a network component of the network;

wherein a user interface is included with a graph for display threats to the network, the graph including a Y-axis identifying a plurality of groups of the network data, and an X-axis identifying an extent to which the groups at least one of correlate and overlap with a predetermined profile.

20. A method for adaptive network data monitoring, comprising:

monitoring network data utilizing at least one threshold;

automatically detecting whether there is a change in a network; and if a change in the network is detected, automatically modifying the at least one threshold based on whether the modification violates any predetermined rule;

wherein the change includes at least one of adding a network component of the network, removing a network component of the network, and changing a network component of the network;

wherein a user interface is included with a graph for displaying threats to the network, the graph including a Y-axis identifying a plurality of groups of the network data, and an X-axis identifying an extent to which the groups at least one of correlate and overlap with a predetermined profile.

21. A method for adaptive network data monitoring, comprising:

(a) initializing a network data collection framework including:

(i) selecting a time period, (ii) identifying a plurality of thresholds, and (iii) identifying a plurality of rules associated with the thresholds;

(b) monitoring network data from a plurality of network data sources of a network over the time period;

(c) automatically determining whether any of the thresholds are met based on the monitoring;

(d) if it is determined that any of the thresholds are met, automatically generating an alert;

(e) automatically detecting whether there is a change in the network;

(f) if a change in the network is detected, modifying the thresholds based on the change;

(g) automatically determining whether the modified thresholds violate any of the rules; and (h) if the modified thresholds violate any of the rules, automatically prompting for user intervention;

wherein the change includes at least one of adding a network component of the network, removing a network component of the network, and changing a network component of the network;

wherein a user interface is included with a graph for displaying threats to the network, the graph including a Y-axis identifying a plurality of groups of the network data, and an X-axis identifying an extent to which the groups at least one of correlate and overlap with a predetermined profile.

* * * * *

UNITED STATES PATENT AND TRADEMARK OFFICE

CERTIFICATE OF CORRECTION

PATENT NO. : 7,114,183 B1
APPLICATION NO. : 10/230844
DATED : September 26, 2006
INVENTOR(S) : Herbert V. Joiner It is certified that error appears in the above-identified patent and that said Letters Patent is hereby corrected as shown below:

Col. 11, line 21 replace "display" with --displaying--.

Signed and Sealed this

Second Day of February, 2010

David J. Kappos

*Director of the United States Patent and Trademark Office*